June 19, 1951
L. H. MOOMAW ET AL
2,557,389
CAMERA FADE-OUT INDICATOR
Filed April 13, 1948
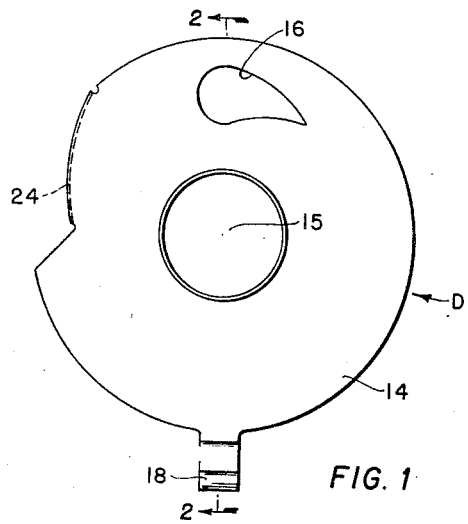
FIG. 1
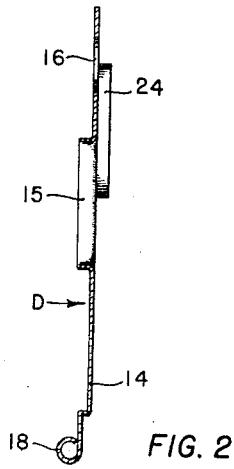
FIG. 2
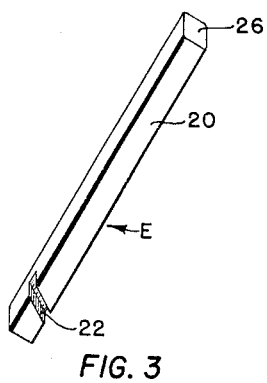
FIG. 3
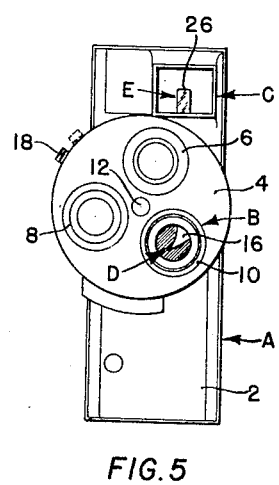
FIG. 4
FIG. 5
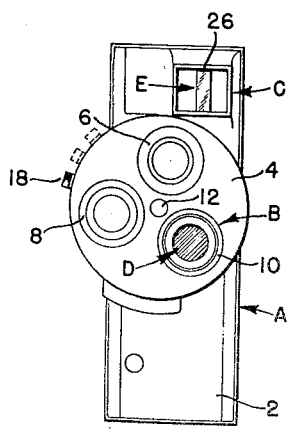
FIG. 6
INVENTOR
LEWIS H. MOOMAW
FREDERIC A. LUNZER
BY
ATTORNEY Patented June 19, 1951

2,557,389

UNITED STATES PATENT OFFICE 2,557,389

CAMERA FADE-OUT INDICATOR

Lewis H. Moomaw, Great Neck, and Frederic A. Lunzer, New York, N. Y., assignors to DeJur-Amsco Corporation, Long Island City, N. Y., a corporation of New York Application April 13, 1948, Serial No. 20,764

6 Claims. (Cl. 88—16)

The present invention relates to a camera fade-out indicator and in particular to one which is visible in the view finder of the camera and which instantaneously indicates the degree of fade-out to which the lens is subjected.

In cameras, and particularly in motion picture cameras, fade-out attachments have long been in use, these attachments progressively obscuring or exposing the camera lens so as to achieve desired photographic effects. The obscuring action may occur in many ways, among which may be mentioned concentrically, diagonally, laterally or vertically with respect to the lens opening. It is most desirable, when a fade-out attachment is employed, that the user of the camera be at all times apprised of the effective condition of said attachment in order properly to control his picture taking. If the fade-out attachment is in position to obscure the lens, then any attempt at photography would be partially or wholly fruitless and would merely result in a waste of film. Some indicator is therefore necessary to apprise the photographer whether or not his lens is obscured. It is most desirable that such an indicator be rendered visible in a position such that it will positively insinuate itself upon the attention of the photographer even if the photographer has forgotten about the existence or status of the fade-out attachment. To that end, it has been proposed that the indicator be rendered visible in the view finder of the camera so that whenever the photographer, in attempting to take a picture, looks through the view finder, he will immediately be apprised of the condition of the fade-out attachment.

Such fade-out indicators as heretofore known suffer from the practical defect, however, that they indicate only when the fade-out attachment is in its full fade-out position, but do not indicate even the existence of intermediate fade-out positions. Moreover, such fade-out attachments are generally spring driven and therefore, when once set in motion, are not controllable by the photographer as to degree of fade-out. This makes it extremely difficult to achieve those photographic double exposure effects which are possible when the position of the fade-out attachment is manually controllable. For example, it may be desired to progressively fade out a given scene from one side of the picture to another and at the same time expose a different scene on the faded out portions of the same picture frame so that as the motion picture frame is exhibited, a scene, for example, of the Champs Élysées in Paris will disappear and at the same time a scene of Fifth Avenue in New York will appear in the very area of the image which Paris previously occupied. The same effect may, of course, be attained in the photography of still subjects such as titles or in the combined photography of still and moving objects.

In order that these effects be accurately attainable, it is necessary that the photographer know at all times the exact position of the fade-out attachment as that attachment moves between its non-fade-out and its full fade-out positions, and that he be apprised of said instantaneous intermediate position at the same time that he is photographing his subject and without detracting his attention from the manifold difficulties involved in properly framing or viewing that subject.

To this end, it is the prime object of the present invention to devise an indicator which will at all times show the photographer the exact instantaneous position of the fade-out attachment.

It is a further object of the present invention to devise such an indicator which is visible to the photographer without materially detracting his attention from the other duties involved in photography. To this end, the indicator is rendered visible in the view finder of the camera, said indicator being invisible in said view finder when the fade-out attachment is in its non-fade-out position and becoming progressively more and more visible in the view finder as the fade-out attachment moves toward its full fade-out position, the indicator being completely visible in the view finder when the fade-out attachment is in its full fade-out position.

Yet another object is to construct a fade-out plate and an indicator operatively connected thereto in an exceedingly simple and inexpensive manner.

To the accomplishment of the foregoing objects and such other objects as may hereinafter appear, the present invention relates to a fade-out attachment indicator as defined in the appended claims and as described in this specification, taken together with the accompanying drawings, in which:

Fig. 1 is a front view of one type of fade-out plate particularly adapted for use with the indicator of the present invention;

Fig. 2 is a view taken along the line 2—2 of Fig. 1;

Fig. 3 is a perspective view of the indicator rod; and

Figs. 4, 5 and 6 are front views of a camera fitted with the fade-out plate of Figs. 1 and 2 and the indicator rod of Fig. 3, illustrating the positions assumed in the camera by those elements as the fade-out plate is moved from its non-fade-out position of Fig. 4 through an intermediate fade-out position of Fig. 5 to the full fade-out position of Fig. 6.

Viewed generically, the camera A embodying the present invention includes a lens B, a view finder C, a progressive fade-out member D mounted between the lens B and the film to be exposed and progressively movable between full fade-out and non-fade-out positions, and an indicator E operatively connected to the fade-out member D and visible in the view finder C for instantaneously indicating the degree of fade-out achieved by the fade-out member D.

As here illustrated, the camera comprises a casing 2 of conventional form on the front of which may be mounted a lens turret 4 having thereon a plurality of lenses 6, 8 and 10, each usable under different photographic conditions. The turret 4 is rotatable about stud 12 so as to bring any desired one of the lenses 6, 8 or 10 into operative position, all as is common in the art. As here illustrated, the lens 10 is in operative position.

The progressive fade-out member D here takes the form of a rotatable plate 14 mounted on the casing 2 between the lens turret 4 and the film to be exposed, the plate 14 having a fade-out aperture 16 of any appropriate shape. As illustrated, the aperture 16 is of teardrop shape arranged on the plate 14 concentric with its center of rotation 15. The shape of aperture 16 may vary within wide limits, all as well known in the art, for the achievement of desired fade-out effects. The plate 14 is rotatable behind the lenses 6, 8 and 10 so as to be movable between the position illustrated in Fig. 4, in which the widest part of the fade-out aperture 16 is interposed between lens 10 and the film, that widest part being of sufficient dimension so that no fading out takes place, continuously through an infinite number of intermediate positions, one of which is illustrated in Fig. 5, in which a narrow portion of the aperture 16 is disposed behind the lens 10, thus achieving desired degrees of fade-out, to the position illustrated in Fig. 6 in which no part of the aperture 16, but instead the opaque portion of the plate 14, is interposed between the lens 10 and the film to be exposed, so that complete or full fade-out is achieved. The plate 14 may be provided with a finger piece 18 which projects out beyond the periphery of the turret 4 so as to be graspable by the photographer and movable to any desired position and at any desired speed by the photographer. The positions of the finger piece 18 corresponding to the positions of the rotatable plate 14 are illustrated in Figs. 4, 5 and 6 in solid lines, the positions which the finger piece 18 assumed in previous figures being indicated in broken lines.

The indicator is in the form of a rod 20 having a groove 22 formed toward the lower end thereof, said groove encompassing and engaging a cam in the form of an appropriately contoured lip 24 on the plate 14. It will be noted that, whereas the aperture 16 is concentrically disposed on the plate 14, the lip 24 is eccentrically disposed thereon so that as the plate 14 is rotated between its positions of Figs. 4 and 6, that portion of the lip 24 which engages in the slot 22 in the rod 22 will vary in its distance from the center of rotation 15 of the plate 14, the lip 24 thus acting as a cam on the rod 20 to progressively lift the rod 20 as the plate 14 is rotated from its non-fade-out position of Fig. 4 through its intermediate positions of fade-out as typified in Fig. 5 to its position of full fade-out as illustrated in Fig. 6.

The length of the indicator rod 20 is so chosen with reference to the distance between the plate 14 and the view finder C that when the plate 14 is in its position of Fig. 4, the upper tip 26 of the rod 20 is not visible in the view finder C. However, as soon as the fade-out member D has been moved from its non-fade-out position toward its full fade-out position, the tip 26 of the rod 20 will become visible in the view finder C, the rod 20 being moved upwardly by reason of its operative connection with the plate 14 a degree commensurate with the amount that the plate 14 has been rotated from its non-fade-out position. Consequently, the amount of the rod 20 which is visible in the view finder C, or in other words, the distance which the tip 26 of the rod 20 projects upwardly across the field of view through the view finder C, will be determined by and therefore will be indicative of the position of the progressive fade-out member D. Hence the photographer, while he is looking through the view finder C so as properly to photograph the desired subject, is apprised of the exact and instantaneous degree of fade-out which he has achieved by manipulation of the finger piece 18.

When the fade-out member D has been moved to its full fade-out position, it is preferable that the tip 26 of the rod 20 reach the top of the view finder C, or in other words, that the rod 20 completely intersect or project across the field of view through the view finder C, thus indicating to the photographer that complete fade-out has been achieved.

The advantages of this construction will in the main be fully apparent from the above description. Whenever the photographer attempts to take a picture, he must look through the view finder C and when he does so if he sees the indicator rod 20 at all, he will immediately become aware of the fact that the camera is in at least a partially faded-out condition. It is particularly significant that this indication will appear even when full fade-out has not been achieved so that all possibility of accidental exposure of the film when the camera is not in condition to fully record that exposure will be prevented. In addition, the precise degree of fade-out is indicated so that the photographer may achieve any desired fade-out effect at will since he has the fade-out manipulation constantly under his control at all times. He need only look through the view finder C and need pay no attention to how far the finger piece 18 has been moved or how far it has still to go since the indicator rod 20 is visible in the view finder C at all times and instantaneously indicates these factors.

If desired, fine graduations in the form of horizontal lines 28, illustrated in Fig. 4, may be etched or otherwise formed on the view finder C so as to assist the photographer in estimating the exact degree of fade-out achieved. In such a case, the upper etched line might indicate full fade-out, so that the rod 20 need not project entirely across the field of view of the view finder C.

It will be apparent that many changes in design and construction, particularly in the fade-out member D, the indicator E and the operative connection therebetween, may all be made without departing form the spirit of the invention as defined in the appended claims.

We claim:

1. In a camera, a casing, a lens, a view finder, a rotatable fade-out member disposed in the field of view of the lens, means for manually rotating said member, a fade-out indicator housed within said casing and projectable into visible position in said view finder but normally invisible therethrough, and an interengaging projection and recess connection between said member and said indicator effective to project said indicator into visible position in said view finder to a degree determined by the position of said member between its full fade-out and non-fade-out positions.

2. In a camera, a casing, a lens, a view finder, a rotatable fade-out member disposed thereon in the field of view of the lens, means for manually rotating said member, an eccentrically disposed cam on said member, a fade-out indicator rod housed within said casing and projectable into visible position in said view finder but normally invisible therethrough, said cam being active on said rod to project said rod into visible position in said view finder to a degree determined by the position of said member between its full fade-out and non-fade-out positions.

3. The structure of claim 2, in which said indicator rod projects completely across the field of view of the view finder when said member is in its full fade-out position.

4. The structure of claim 2, in which said view finder is provided with visible graduations cooperable with said indicator rod to show the instantaneous degree of fade-out achieved.

5. In a camera, a casing, a lens, a view finder, a rotatable fade-out plate disposed in the field of view of the lens, means for manually rotating said plate, a fade-out indicator housed within said casing and movable from a first position through a series of intermediate positions to a final position, said indicator being visible in said view finder to an increasing degree as it moves through said intermediate positions to said final position, and an interengaging projection and recess connection between said plate and said indicator effective to move said indicator between its first and final positions to a degree determined by the position of said plate between its full fade-out and non-fade-out positions.

6. In a camera, a casing, a lens, a view finder, a rotatable fade-out plate disposed in the field of view of the lens, means for manually rotating said plate, an eccentrically disposed cam on said plate, a fade-out indicator rod housed within said casing and movable from a first position through a series of intermediate positions to a final position, said indicator being visible in said view finder to an increasing degree as it goes through said intermediate positions to said final position, said cam being active on said rod to move said rod between its first and final positions to a degree determined by the position of said plate between its full fade-out and non-fade-out position.

LEWIS H. MOOMAW.
FREDERIC A. LUNZER.

REFERENCES CITED

The following references are of record in the file of this patent:

UNITED STATES PATENTS

| Number | Name | Date |
|---|---|---|
| 1,447,906 | Snyder et al. | Mar. 6, 1923 |
| 1,870,464 | Ramsey | Aug. 9, 1932 |
| 2,126,338 | Mihalyi | Aug. 9, 1938 |
| 2,196,097 | Brown | Apr. 2, 1940 |
| 2,230,608 | Tornquist | Apr. 21, 1942 |
| 2,307,297 | Phillimore | Jan. 5, 1943 |
| 2,347,520 | Sperry et al. | Apr. 25, 1944 |

FOREIGN PATENTS

| Number | Country | Date |
|---|---|---|
| 315,360 | Great Britain | Mar. 27, 1930 |